United States Patent
Li et al.

(10) Patent No.: US 11,763,229 B2
(45) Date of Patent: Sep. 19, 2023

(54) PICKING SEQUENCE OPTIMIZATION WITHIN A WAREHOUSE FOR AN ITEM LIST

(71) Applicant: Maplebear Inc., San Francisco, CA (US)

(72) Inventors: Xinyu Li, Kent, OH (US); Haixun Wang, Palo Alto, CA (US); Ruoming Jin, Aurora, OH (US)

(73) Assignee: Maplebear Inc., San Francisco, CA (US)

( * ) Notice: Subject to any disclaimer, the term of this patent is extended or adjusted under 35 U.S.C. 154(b) by 43 days.

(21) Appl. No.: 17/458,127

(22) Filed: Aug. 26, 2021

(65) Prior Publication Data

US 2023/0062937 A1   Mar. 2, 2023

(51) Int. Cl.
| | |
|---|---|
| *G06Q 10/0631* | (2023.01) |
| *G06Q 30/0601* | (2023.01) |
| *G06F 16/901* | (2019.01) |
| *G06Q 10/087* | (2023.01) |
| *G06Q 10/047* | (2023.01) |

(52) U.S. Cl.
CPC ... *G06Q 10/06316* (2013.01); *G06F 16/9024* (2019.01); *G06Q 10/047* (2013.01); *G06Q 10/087* (2013.01); *G06Q 30/0633* (2013.01)

(58) Field of Classification Search
None
See application file for complete search history.

(56) References Cited

U.S. PATENT DOCUMENTS

| | | | | |
|---|---|---|---|---|
| 2009/0112675 A1* | 4/2009 | Servais | ............ | G06Q 10/06315 705/7.27 |
| 2013/0317642 A1* | 11/2013 | Asaria | .................... | G06Q 10/08 700/216 |

(Continued)

FOREIGN PATENT DOCUMENTS

| | | | | |
|---|---|---|---|---|
| WO | WO-9903760 A1 * | 1/1999 | ........... | B65G 1/1376 |
| WO | WO-2017097724 A1 * | 6/2017 | ............ | B25J 9/0093 |

OTHER PUBLICATIONS

Kim "Order Picking Sequence Algorithms for a Gantry-Picking Warehouse", Dec. 2003, IIE Annual Conference. Proceedings; Norcross, pp. 1-6. (Year: 2003).*

(Continued)

*Primary Examiner* — Romain Jeanty
(74) *Attorney, Agent, or Firm* — Fenwick & West LLP (57) ABSTRACT

An online concierge system generates a suggested picking sequence to reduce the amount of time for a shopper to fulfill an online order of items from a warehouse. The online concierge system determines an average amount of time to sequentially pick items between different aisle pairs for a warehouse based on timestamps from item fulfillment in historical orders. The system generates a distance graph including aisle nodes connected by edges representing the pairwise distance between aisles. The system solves a traveling salesperson problem to generate a ranked order of aisle nodes for each of the historical orders. The system generates a ranked global sequence of aisle nodes based on the plurality of ranked orders of aisle nodes. The system applies the ranked global sequence to new delivery orders to generate the suggested picking sequence for a shopper.

20 Claims, 6 Drawing Sheets

(56) References Cited

U.S. PATENT DOCUMENTS

| | | | |
|---|---|---|---|
| 2014/0279661 A1* | 9/2014 | Zahn | G06Q 50/28 |
| | | | 705/341 |
| 2019/0138978 A1* | 5/2019 | Johnson | G06Q 10/08 |
| 2019/0236525 A1* | 8/2019 | Stanley | G06N 3/08 |
| 2021/0142265 A1* | 5/2021 | Thao | G06Q 10/063112 |
| 2022/0188910 A1* | 6/2022 | Jin | G06Q 30/0635 |

OTHER PUBLICATIONS

Jens "A new approach to model and optimize the order sequence of a two-stage storage and order picking system with particular attention to restrictions of the material flow ", Mar. 2016, Procedia—Social and Behavioral Sciences 220, pp. 434-443 (Year: 2016).*

Jiun-Yan "A warehouse management system with sequential picking for multi-container deliveries", Dec. 2010, Co1nputers & Industrial Engineering, pp. 382-392 (Year: 2010).*

Cohen, W.W. et al., "Learning to Order Things," Journal of Artificial Intelligence, vol. 10, May 1999, pp. 243-270.

* cited by examiner

PICKING SEQUENCE OPTIMIZATION WITHIN A WAREHOUSE FOR AN ITEM LIST

BACKGROUND

This disclosure relates generally to machine-learned ranking, and more specifically to determining an optimal sequence within a warehouse for an item list.

In current online concierge systems, shoppers (or "pickers") fulfill orders at a physical warehouse, such as a retailer, on behalf of customers as part of an online shopping concierge service. An online concierge system provides an interface to a customer identifying items offered by a physical warehouse and receives selections of one or more items for an order from the customer. In current online concierge systems, the shoppers may be sent to various warehouses with instructions to fulfill orders for items, and the shoppers then find the items included in the customer order in a warehouse.

When generating the interface to a consumer from which the consumer selects one or more items, the online concierge system receives information identifying items offered by a warehouse from the warehouse and generates the interface from the information received from the warehouse. The online concierge system may categorize the items identified by the warehouse from the received information and use the categorization when generating the interface. For example, the online concierge system leverages information from the warehouse describing items offered by the warehouse so the items are categorized to replicate their placement in aisles within the warehouse.

When filling a long item list, it is difficult for the shopper to find all items in an efficient manner. The shopper may be unfamiliar with the warehouse layout, and when evaluating an item list, it may be difficult for the shopper to determine the sequence in which to pick the items. Even with item lists that are organized by item category or aisle number, different warehouses are organized differently, and shoppers may spend unnecessary time moving back and forth between aisles when shopping for items.

SUMMARY

An online concierge system generates a suggested picking sequence to reduce the amount of time for a shopper to fulfill an online order of items from a warehouse. The online concierge system determines an average amount of time to sequentially pick items between different aisle pairs for a warehouse based on timestamps from item fulfillment in historical orders. The system generates a distance graph including aisle nodes connected by edges representing the pairwise distance between aisles. The system solves a traveling salesperson problem to generate a ranked order of aisle nodes for each of the historical orders. The system generates a ranked global sequence of aisle nodes based on the plurality of ranked orders of aisle nodes. The system applies the ranked global sequence to new delivery orders to generate the suggested picking sequence for a shopper.

In some embodiments, a method may comprise calculating, by an online concierge system, a pairwise distance between each pair of aisles in a warehouse. The online concierge system may generate a distance graph comprising a plurality of aisle nodes. For each of a set of historical orders, the online concierge system may generate a ranked order of aisle nodes in the plurality of aisle nodes. The online concierge system may generate, based on the ranked orders of aisle nodes for the set of historical orders, a ranked global sequence of the plurality of aisle nodes. The online concierge system may receive a delivery order from a customer. The online concierge system may generate a suggested picking sequence for the delivery order. The online concierge system may transmit the suggested picking sequence to a mobile device of a shopper.

In some embodiments, a method may comprise receiving, by an online concierge system, a delivery order from a customer, the delivery order identifying a warehouse and a plurality of items. The online concierge system may apply a ranked global sequence of aisles to the plurality of items. The online concierge system may generate, based on the applying, a suggested picking sequence for the delivery order. The online concierge system may transmit the suggested picking sequence to a mobile device of a shopper.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
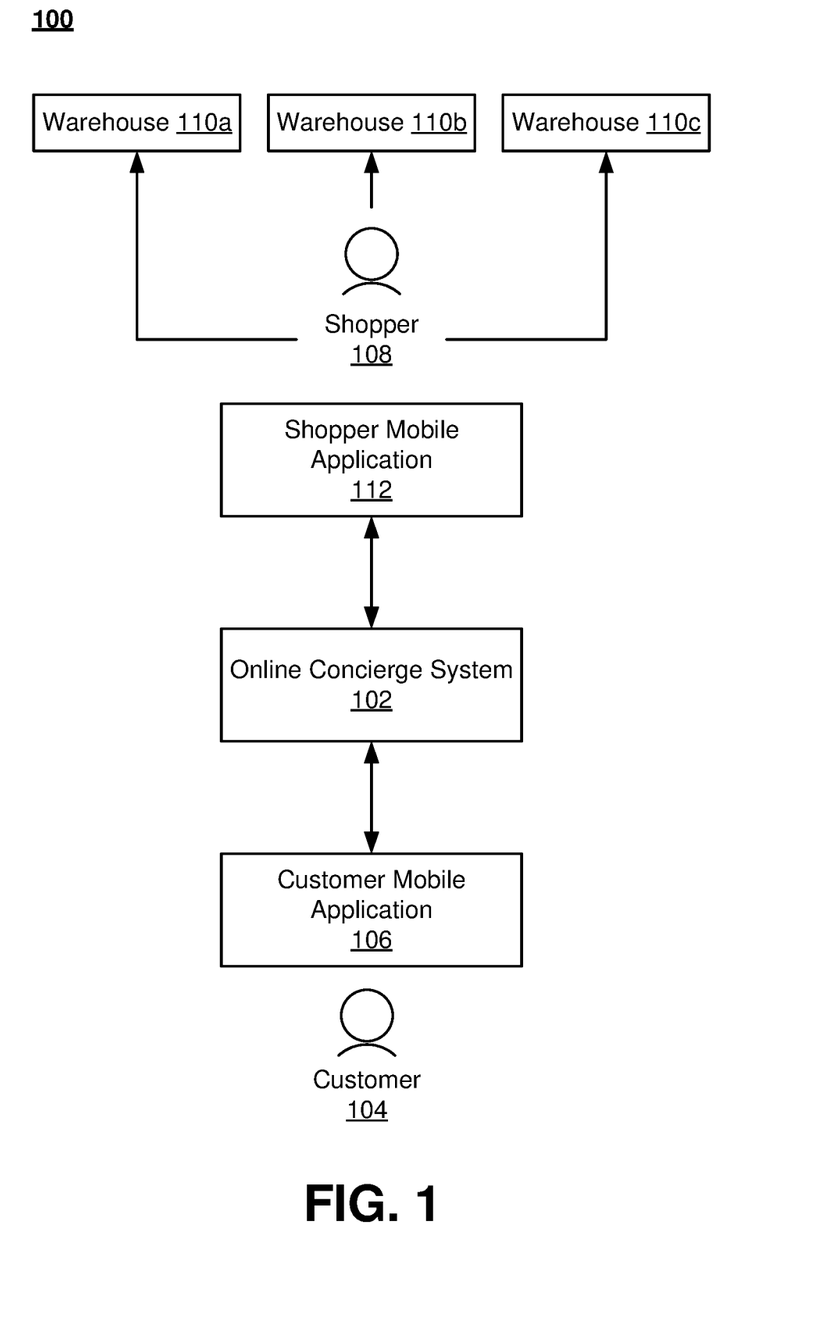
FIG. 1 illustrates an environment of an online shopping concierge service, according to one embodiment.

FIG. 1 illustrates an environment 100 of an online platform, according to one embodiment. The figures use like reference numerals to identify like elements. A letter after a reference numeral, such as "110a," indicates that the text refers specifically to the element having that particular reference numeral. A reference numeral in the text without a following letter, such as "110," refers to any or all of the elements in the figures bearing that reference numeral. For example, "110" in the text refers to reference numerals "110a" and/or "110b" in the figures.

The environment 100 includes an online concierge system 102. The system 102 is configured to receive orders from one or more customers 104 (only one is shown for the sake of simplicity). An order specifies a list of goods (items or products) to be delivered to the customer 104. The order also specifies the location to which the goods are to be delivered, and a time window during which the goods should be delivered. In various embodiments, the order specifies one or more retailers from which the selected items should be purchased. The customer may use a customer mobile application (CMA) 106 to place the order; the CMA 106 is configured to communicate with the online concierge system 102.

The online concierge system 102 is configured to transmit orders received from customers 104 to one or more shoppers 108. The online concierge system 102 is configured to provide the list of items in the order in a suggested picking sequence to decrease the amount of time required by the shopper 108 to fulfill the order. A shopper 108 may be a contractor, employee, or other person (or entity) who is enabled to fulfill orders received by the online concierge system 102. The shopper 108 travels between a warehouse and a delivery location (e.g., the customer's home or office). A shopper 108 may travel by car, truck, bicycle, scooter, foot, or other mode of transportation. In various embodiments, the delivery may be partially or fully automated, e.g., using a self-driving car. The environment 100 also includes three warehouses 110a, 110b, and 110c (only three are shown for the sake of simplicity; the environment could include hundreds of warehouses). The warehouses 110 may be physical retailers, such as grocery stores, discount stores, department stores, etc., or non-public warehouses storing items that can be collected and delivered to customers. Each shopper 108 fulfills an order received from the online concierge system 102 at one or more warehouses 110, delivers the order to the customer 104, or performs both fulfillment and delivery. In one embodiment, shoppers 108 make use of a shopper mobile application 112 which is configured to interact with the online concierge system 102.

Figure 2:
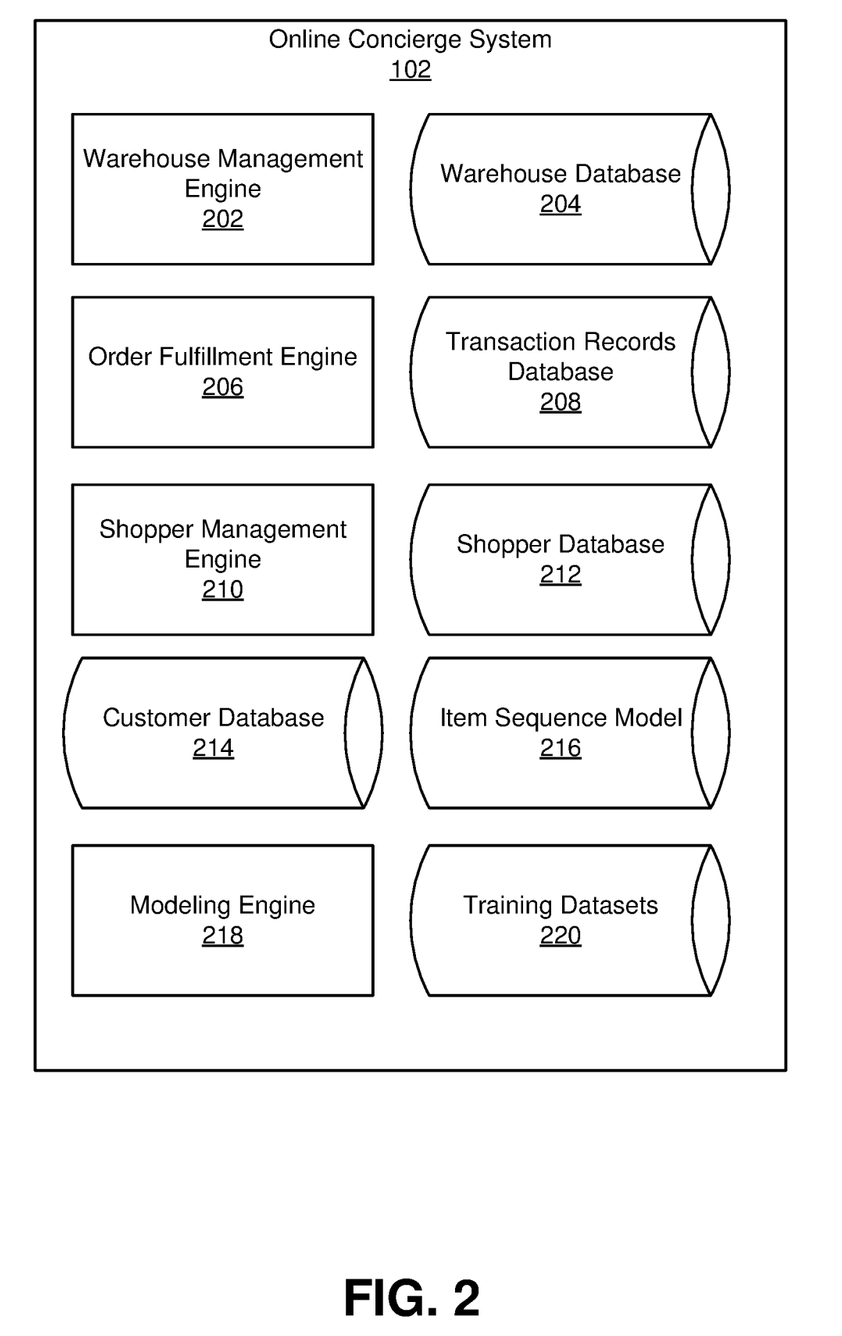
FIG. 2 is a diagram of an online shopping concierge system, according to one embodiment.

FIG. 2 is a diagram of an online concierge system 102, according to one embodiment. The online concierge system 102 includes a warehouse management engine 202, which interacts with inventory systems associated with each warehouse 110. The warehouse management engine 202 is configured to obtain information regarding each warehouse 110.

The warehouse management engine 202 requests and receives inventory information maintained by the warehouse 110. The inventory of each warehouse 110 is unique and may change over time. The warehouse management engine 202 monitors changes in inventory for each participating warehouse 110. The warehouse management engine 202 is also configured to store inventory records in an warehouse database 204. The warehouse database 204 may store information in separate records—one for each participating warehouse 110—or may consolidate or combine inventory information into a unified record. Inventory information includes both qualitative and qualitative information about items, including size, color, weight, SKU, serial number, and so on. In one embodiment, the warehouse database 204 also stores purchasing rules associated with each item if they exist. For example, age-restricted items such as alcohol and tobacco are flagged accordingly in the warehouse database 204. Additional inventory information useful for predicting the availability of items may also be stored in the warehouse database 204. For example, for each item-warehouse combination (a particular item at a particular warehouse), the warehouse database 204 may store a time that the item was last found, a time that the item was last not found (a shopper looked for the item but could not find it), the rate at which the item is found, and the popularity of the item.

The warehouse management engine 202 is configured to obtain item location information for each warehouse 110. The item location information describes the location of each item present within the warehouse. For each item, the location may be described with reference to an area, department, aisle, floor, reference system or some combination thereof. As used herein, an aisle may be used to define any area within a warehouse. For example, aisles may be numbered or lettered and refer to shelves of items typically located within the interior portion of a warehouse. Aisles may be named and refer to departments located around the perimeter of a warehouse (e.g., produce or deli). An aisle may be divided into multiple sections. For example, the location of a bag of flour may be described with respect to a subsection of an aisle number. The warehouse management engine 202 may receive the item location information from one or more sources. In some embodiments, each warehouse 110 may provide the warehouse management engine 202 with the item location information, such as by providing a product catalog. In some embodiments, the online concierge system 102 may employ shoppers or other individuals to visit warehouses 110 to walk through warehouses 110 and obtain the item location information. In some embodiments, in response to a shopper finding an item for a customer order, the shopper may scan the item at the item location using the shopper mobile application 112, and the warehouse management engine 202 may prompt the shopper to input an aisle value where the item was found. In some embodiments, the warehouse management engine 202 may assign an aisle value to an item based on knowledge from other warehouses. For example, the warehouse management engine 202 may assign salt to a "spices" aisle, even if the warehouse does not provide any information about a particular aisle where the salt is located.

The item location information may be stored in the warehouse database 204. Inventory and item location information provided by the warehouse management engine 202 may supplement the training datasets 220.

Items stored in the warehouse database 204 may be identified by item identifiers. In various embodiments, various attributes, some of which are specific to the warehouse (e.g., a location of the item within the warehouse, a time that the item was last found in the warehouse, a time that the item was last not found in the warehouse, the rate at which the item is found, the popularity of the item), may be stored for each item in the warehouse database 204. Similarly, each warehouse may be identified by a warehouse identifier and stored in the warehouse database 204 along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. Based on the identifier(s), the online concierge system 102 can extract information about the item and/or warehouse from the warehouse database 204 and/or warehouse database and provide this extracted information as inputs to the item sequence model 216.

The warehouse database 204 may store aisle information for each warehouse. In some embodiments, the aisle information may comprise names or numbers of aisles within the warehouse. In some embodiments, the aisle information may comprise relative or absolute positions of the aisles within the warehouse. In some embodiments, the aisle information may comprise a list of all items located within each aisle.

The online concierge system 102 also includes an order fulfillment engine 206 which is configured to synthesize and display an ordering interface to each customer 104 for a customer ordering session (for example, via the customer mobile application 106). The order fulfillment engine 206 is also configured to access the warehouse database 204 in order to determine which products are available at which warehouse 110. The order fulfillment engine 206 determines a sale price for each item ordered by a customer 104. Prices set by the order fulfillment engine 206 may or may not be identical to in-store prices determined by retailers (which is the price that customers 104 and shoppers 108 would pay at the retail warehouses). The order fulfillment engine 206 also facilitates transactions associated with each order. In one embodiment, the order fulfillment engine 206 charges a payment instrument associated with a customer 104 when he/she places an order. The order fulfillment engine 206 may transmit payment information to an external payment gateway or payment processor. The order fulfillment engine 206 stores payment and transactional information associated with each order in a transaction records database 208.

In various embodiments, the order fulfillment engine 206 also shares order details with warehouses 110. For example, after successful fulfillment of an order, the order fulfillment engine 206 may transmit a summary of the order to the appropriate warehouses 110. The summary may indicate the items purchased, the total value of the items, and in some cases, an identity of the shopper 108 and customer 104 associated with the transaction. In one embodiment, the order fulfillment engine 206 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 206, which provides detail of all orders which have been processed since the last request.

The order fulfillment engine 206 may interact with a shopper management engine 210, which manages communication with and utilization of shoppers 108. In one embodiment, the shopper management engine 210 receives a new order from the order fulfillment engine 206. The shopper management engine 210 identifies the appropriate warehouse to fulfill the order based on one or more parameters, such as a warehouse selected by a customer 104, a probability of item availability, the contents of the order, the inventory of the warehouses, and the proximity to the delivery location. The shopper management engine 210 then identifies one or more appropriate shoppers 108 to fulfill the order based on one or more parameters, such as the shoppers' proximity to the appropriate warehouse 110 (and/or to the customer 104), his/her familiarity level with that particular warehouse 110, and so on. Additionally, the shopper management engine 210 accesses a shopper database 212 which stores information describing each shopper 108, such as his/her name, gender, rating, previous shopping history, and so on.

As part of fulfilling an order, the order fulfillment engine 206 and/or shopper management engine 210 may access a customer database 214 which stores information describing each customer. This information could include each customer's name, address, gender, shopping preferences, favorite items, stored payment instruments, and so on.

Machine Learning Model

The online concierge system 102 further includes an item sequence model 216, a modeling engine 218, and training datasets 220. The modeling engine 218 uses the training datasets 220 to generate the item sequence model 216. The item sequence model 216 can learn from the training datasets 220, rather than follow only explicitly programmed instructions. The warehouse management engine 202, order fulfillment engine 206, and/or shopper management engine 210 can use the item sequence model 216 to determine a suggested sequence for a shopper to pick items. An item sequence model 216 may be unique for each warehouse stored in warehouse database 204.

The item sequence model 216 can be configured to receive inputs including a list of items for an order, a selected warehouse, item location information, in-store shopper location data, and a last item picked by the shopper. The item sequence model 216 may be adapted to receive any information that the modeling engine 218 identifies as indicators of picking efficiency. The item sequence model 216 is configured to output the list of items is a suggested picking sequence. The suggested picking sequence is configured to decrease the amount of time spent by the shopper to fill the order.

The item sequence model 216 contains a set of functions generated by the modeling engine 218 from the training datasets 220 that relate the list of items, warehouse floorplan layouts, item location information, in-store shopper location data, a last item picked by the shopper, and/or any other relevant inputs to the suggested picking sequence. The item sequence model 216 comprises a ranked list of aisles within a warehouse. The aisles are ranked in a manner to decrease the total time required to fulfill an order when items are located in different aisles. The ranked list of aisles may be applied to a set of items in a customer order. For a given set of items for a warehouse, the item sequence model 216 outputs an item list in a suggested picking sequence. The item sequence model 216 constructs the relationship between the input item list and/or any other inputs and the output picking sequence that is generic enough to apply to any number of different item lists. The set of functions of the item sequence model 216 may be updated and adapted following retraining with new training datasets 220. The item sequence model 216 may be any machine learning model, such as a neural network, boosted tree, gradient boosted tree, or random forest model. In some examples, the item sequence model 216 is generated from XGBoost algorithm.

The suggested picking sequence generated by the item sequence model 216 may be used to determine the sequence of items displayed to the shopper 108 in response to the shopper 108 accessing the shopper mobile application 112, as described in further detail below.

The training datasets 220 relate a variety of different factors to known picking information from previous delivery orders (e.g., the duration between two sequentially picked items in a particular warehouse). The training datasets 220 include the items picked, an aisle associated with each of the items picked, a time of each item picked, a duration between sequentially picked items, warehouse floorplan layouts, item location information, in-store shopper location data, or some combination thereof. The training datasets 220 are very large datasets taken across a wide cross section of warehouses, shoppers, customers, items, delivery orders, times, and item attributes. The training datasets 220 are large enough to provide a reliable average duration between picking sequential items in different aisles in each warehouse. In addition to previous delivery orders, the training datasets 220 may be supplemented by picking information collected by employees or test shoppers.

Machine Learning Factors

The training datasets 220 include associations between lists of items, warehouse floorplan layouts, item location information, in-store shopper location data, a last item picked by the shopper, a duration between sequentially picked items, or some combination thereof. The online concierge system 102 trains the item sequence model 216 using the training datasets 220. The online concierge system 102 applies the model to future customer orders to provide the ordered items to the shopper in a suggested item picking sequence to minimize the amount of time the shopper spends picking the items.

Each warehouse may comprise a separate training dataset 220. Thus, the online concierge system 102 may generate a separate item sequence model 216 for each warehouse. Because each warehouse may comprise a different floorplan layout, the suggested picking sequence may depend on the selected warehouse. Any two aisles within a warehouse are referred to as a pair of aisles. For each pair of aisles, the training dataset comprises a duration between sequentially picked items each time that items were sequentially picked between the two aisles in prior orders.

The training datasets 220 may include a time associated with previous delivery orders. In various embodiments, the training datasets 220 include a time of day at which each previous delivery order was filled. Time of day may impact the duration between item locations in a warehouse, since during different times of day, or different days of the week, different numbers or types of customers may be located within a warehouse, which could affect the duration between picking sequential items. The relationships between this time information and duration between picking sequential items are determined by the modeling engine 218 training a machine learning model with the training datasets 220, producing the item sequence model 216.

The training datasets 220 include item attributes. In some examples, the item attributes include an aisle associated with the item. For example, if the item is yogurt, it is associated with the dairy aisle. The aisle may be the bakery, beverage, nonfood and pharmacy, fresh produce, canned vegetables, floral, deli, prepared foods, meat, seafood, dairy, the meat department, dairy department, or any other categorization of aisles used by the warehouse. The aisle may correspond to a location within a warehouse. For example, canned vegetables may be associated with a canned vegetable aisle within a warehouse, and fresh produce may be associated with a fresh produce aisle within a warehouse. The relationships between item attributes and duration between picking sequential items are determined by the modeling engine 218 training a machine learning model with the training datasets 220, producing the item sequence model 216.

The training datasets 220 may include additional information that affect the duration between picking sequential items and can therefore be used to build the item sequence model 216 relating the list of items in an order to the suggested picking sequence. The training datasets 220 may be periodically updated with recent picking information. Following updating of the training datasets 220, the modeling engine 218 may retrain a model with the updated training datasets 220 and produce a new item sequence model 216.

The modeling engine 218 is configured to generate the item sequence model 216 using the training datasets 220. The modeling engine 218 may generate a distance graph for each warehouse. Each node in the distance graph may represent an aisle within the warehouse. Each pair of nodes in the distance graph may be connected by an edge.

The edge may store a pairwise distance between the nodes. The pairwise distance is a function of the duration between sequentially picked items in the pair of nodes in historical orders. For example, the online concierge system 102 receives timestamps for two sequentially picked items in a warehouse. Each item may be associated with a different aisle node. The online concierge system 102 evaluates the duration between timestamps for each pair of sequentially picked items corresponding to the connected aisle nodes. For example, the online concierge system 102 may have received durations for one thousand different instances that items were sequentially picked between two aisles in a pair. The value of the edge may be the average of the one thousand duration values. In some embodiments, the online concierge system 102 may eliminate a portion of the longest and shortest durations prior to calculating the average. For example, the online concierge may eliminate the longest 10% of durations, because some shoppers may take a break, such as to take a phone call, between picking sequential items. Thus, the longest durations may not reflect the time spent traveling between two aisles. The online concierge system 102 may eliminate the shortest 10% of durations, because in some instances a shopper may carry an item from a first aisle to a second aisle and scan both items in rapid succession. Thus, the shortest durations may not reflect the time spent traveling between two aisles. In some embodiments, the online concierge system 102 may eliminate durations above or below threshold values. For example, the online concierge system 102 may eliminate durations less than five seconds, because it is unlikely that a shopper could spend less than five seconds to pick items in different aisle. The remaining durations may be averaged to obtain the value for the edge between aisle nodes.

For each of a set of historical orders, the modeling engine 218 may solve a traveling salesperson problem (TSP) applied to traversing the aisle nodes for the items in the historical order. The solution of the TSP may provide a sequence of the aisle nodes for the specific order. The modeling engine 218 may combine the sequences for each order into a ranked global sequence of aisle nodes that contains all aisle nodes for the warehouse. The ranked global sequence may preserve the relative sequence for each order. For example, if a first ranked sequence comprises aisle A<C<E, and a second ranked sequence comprises aisle A<B<C, the ranked global sequence may comprise aisles A<B<C<E, thus preserving the relative rankings in each sequence. In some embodiments, the ranked global sequence may be supplemented with human expertise knowledge. For example, the warehouse database 204 may indicate that a warehouse has ten aisles numbered one through ten. However, the training datasets may not comprise any duration values for aisle seven with any other aisles. The modeling engine 218 may rank aisle seven between adjacent aisles (six and eight) based on the human expertise knowledge that sequentially numbered aisles are typically adjacent to each other. The modeling engine 218 may provide the global ranked sequence to the item sequence model 216 to be applied to future orders at the warehouse.

Customer Mobile Application

Figure 3A:
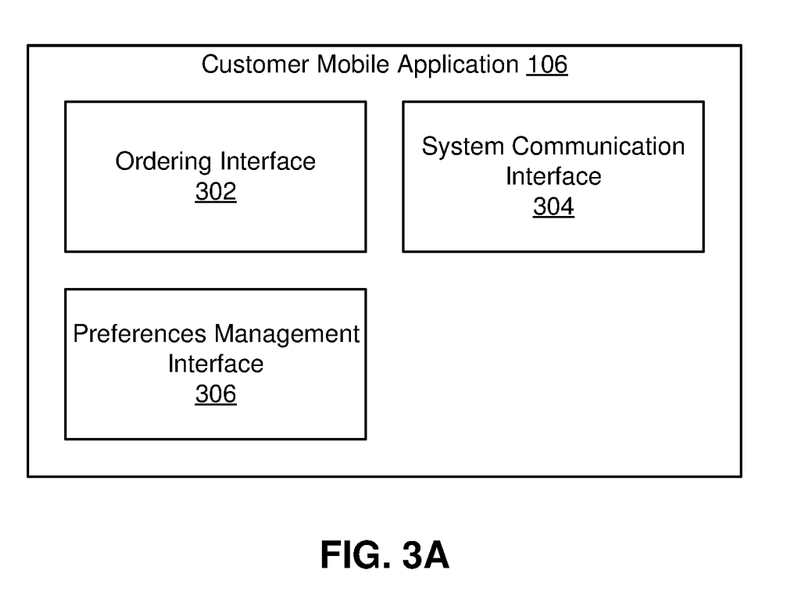
FIG. 3A is a diagram of a customer mobile application (CMA), according to one embodiment.

FIG. 3A is a diagram of the customer mobile application (CMA) 106, according to one embodiment. The CMA 106 includes an ordering interface 302, which provides an interactive interface with which the customer 104 can browse through and select products and place an order. The ordering interface 302 provides a search query interface for the customer to enter a search query. The customer may select an item to order a specific item. The CMA 106 also includes a system communication interface 304 which, among other functions, receives inventory information from the online shopping concierge system 102 and transmits order information to the system 102. The CMA 106 also includes a preferences management interface 306 which allows the customer 104 to manage basic information associated with his/her account, such as his/her home address and payment instruments. The preferences management interface 306 may also allow the customer to manage other details such as his/her favorite or preferred warehouses 110, preferred delivery times, special instructions for delivery, etc.

Shopper Mobile Application

Figure 3B:
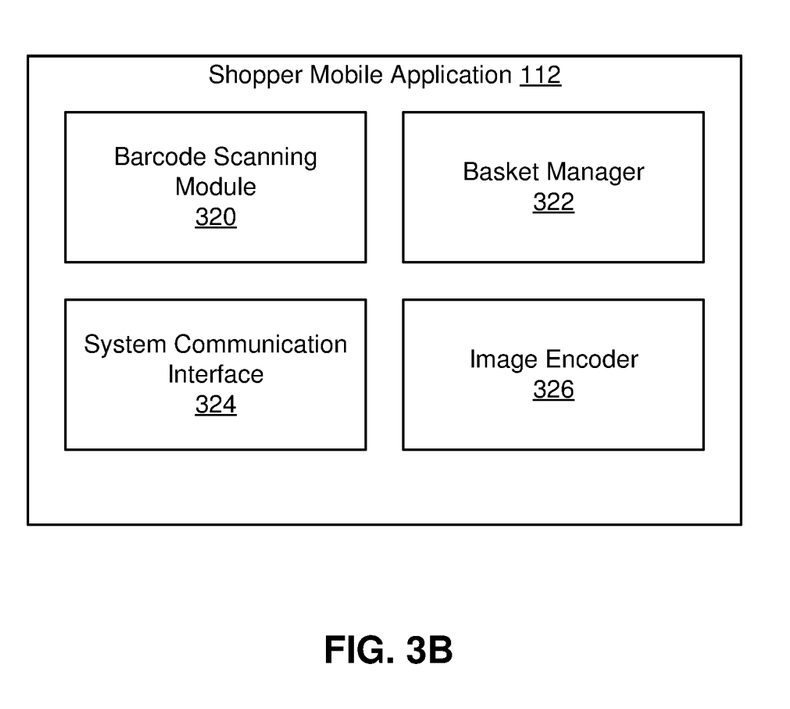
FIG. 3B is a diagram of a shopper mobile application (SMA), according to one embodiment.

FIG. 3B is a diagram of the shopper mobile application (SMA) 112, according to one embodiment. The SMA 112 includes a barcode scanning module 320 which allows a shopper 108 to scan an item at a warehouse 110 (such as a can of soup on the shelf at a grocery store). The barcode scanning module 320 may also include an interface which allows the shopper 108 to manually enter information describing an item (such as its serial number, SKU, quantity and/or weight) if a barcode is not available to be scanned. The SMA 112 records a timestamp each time an item is scanned or manually entered by the shopper 108. SMA 112 also includes a basket manager 322 which maintains a running record of items collected by the shopper 108 for purchase at a warehouse 110. This running record of items is commonly known as a "basket". In one embodiment, the barcode scanning module 320 transmits information describing each item (such as its cost, quantity, weight, etc.) to the basket manager 322, which updates its basket accordingly.

The SMA 112 also includes a system communication interface 324 which interacts with the online shopping concierge system 102. For example, the system communication interface 324 receives an order from the system 102 and transmits the contents of a basket of items to the system 102. The system communication 324 interface may display the list of items for the shopper 208 to pick. The system communication interface 324 may display the list of items in the suggested picking sequence as determined by the online concierge system 102. The system communication interface 324 may display an item location, such as an aisle number, for each item in the suggested picking sequence. In some embodiments, the system communication interface 324 may display the next suggested item in the picking sequence in a larger font, size, or by itself on the SMA 112. The SMA 112 also includes an image encoder 326 which encodes the contents of a basket into an image. For example, the image encoder 326 may encode a basket of goods (with an identification of each item) into a QR code which can then be scanned by an employee of the warehouse 110 at check-out.

Warehouse Floorplan Layout

Figure 4:
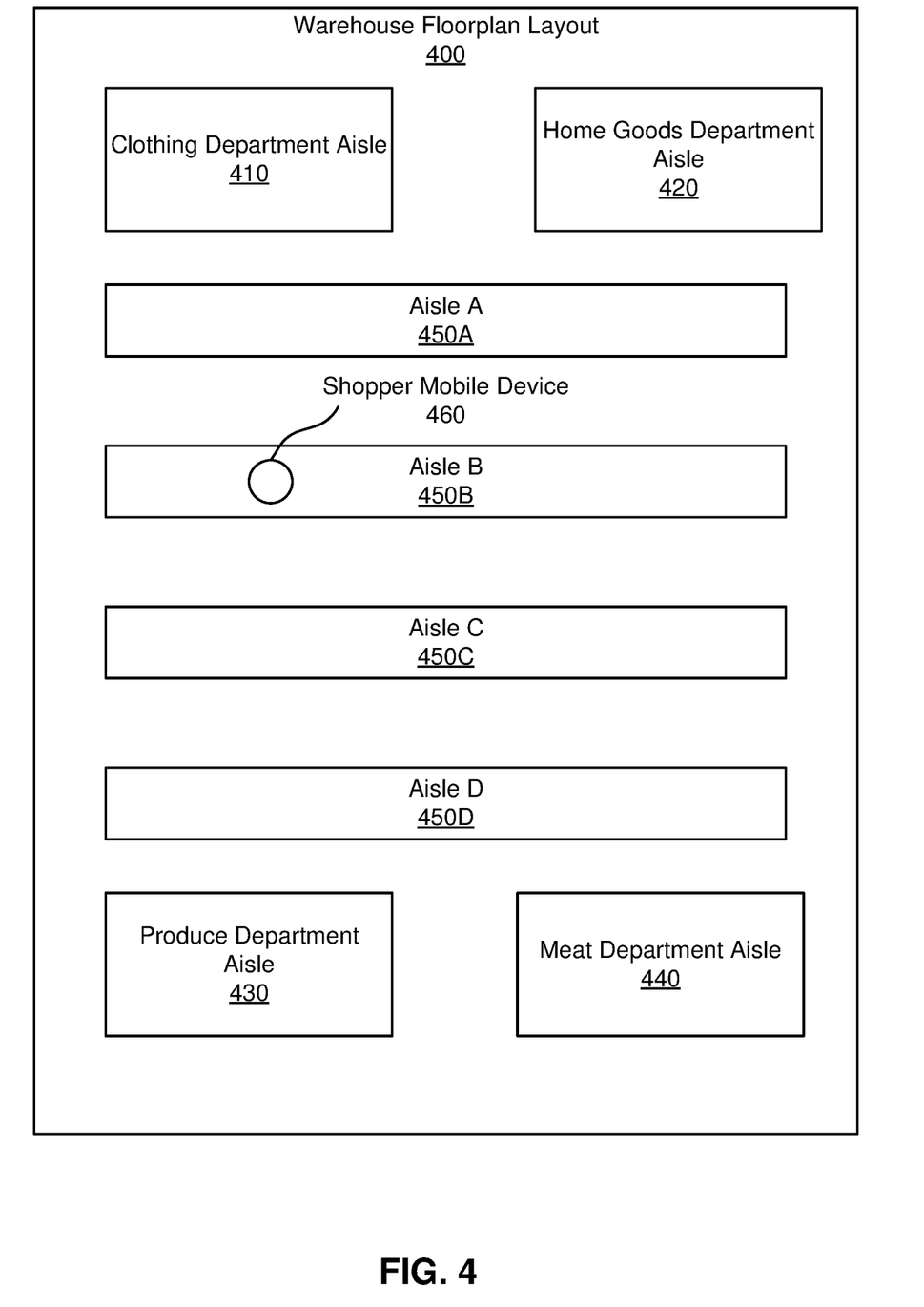
FIG. 4 is a diagram of a warehouse floorplan layout, according to one embodiment.

FIG. 4 illustrates a model of a warehouse floorplan layout 400. The warehouse floorplan layout 400 is a digital representation of a physical layout of a warehouse. The illustrated warehouse floorplan layout 400 comprises a clothing department aisle 410, a home goods department aisle 420, a produce department aisle 430, a meat department aisle 440, and four interior aisles 450A, 450B, 450C, and 450D. Different warehouse floorplan layouts may comprise many different types and arrangements of departments and aisles.

Each time the shopper scans or inputs an item in the SMA on the mobile device 460, the SMA records a time stamp of when the item was scanned. Thus, if a shopper scans an item in aisle 450B at t=0 seconds and subsequently scans an item in aisle 450C at t=15 seconds, the online concierge system may infer that a pairwise distance between aisle 450B and 450D equals 15 seconds.

The location of a shopper within the warehouse floorplan layout 400 may be inferred by detecting a location of a mobile device 460 of the shopper. The shopper may opt in to allow their location to be tracked in the shopper mobile application. The location of the mobile device 460 may be detected using cellular towers, satellite networks, beacons located within the warehouse floorplan layout 400 (e.g., Bluetooth or WiFi beacons), or any other suitable system for detecting a location of the mobile device 460. In some embodiments, the online concierge system 102 may modify the suggested picking order for a shopper based on the location of the shopper. For example, the shopper may skip an item due to a large number of people crowding an area of the item, or the shopper may use the restroom in the middle of picking an order. Because these actions may take the shopper to a different location in the warehouse floorplan layout 400, the online concierge system 102 may recalculate the suggested picking order for remaining items based on a present location of the shopper.

Generating a Suggested Picking Sequence

Figure 5:
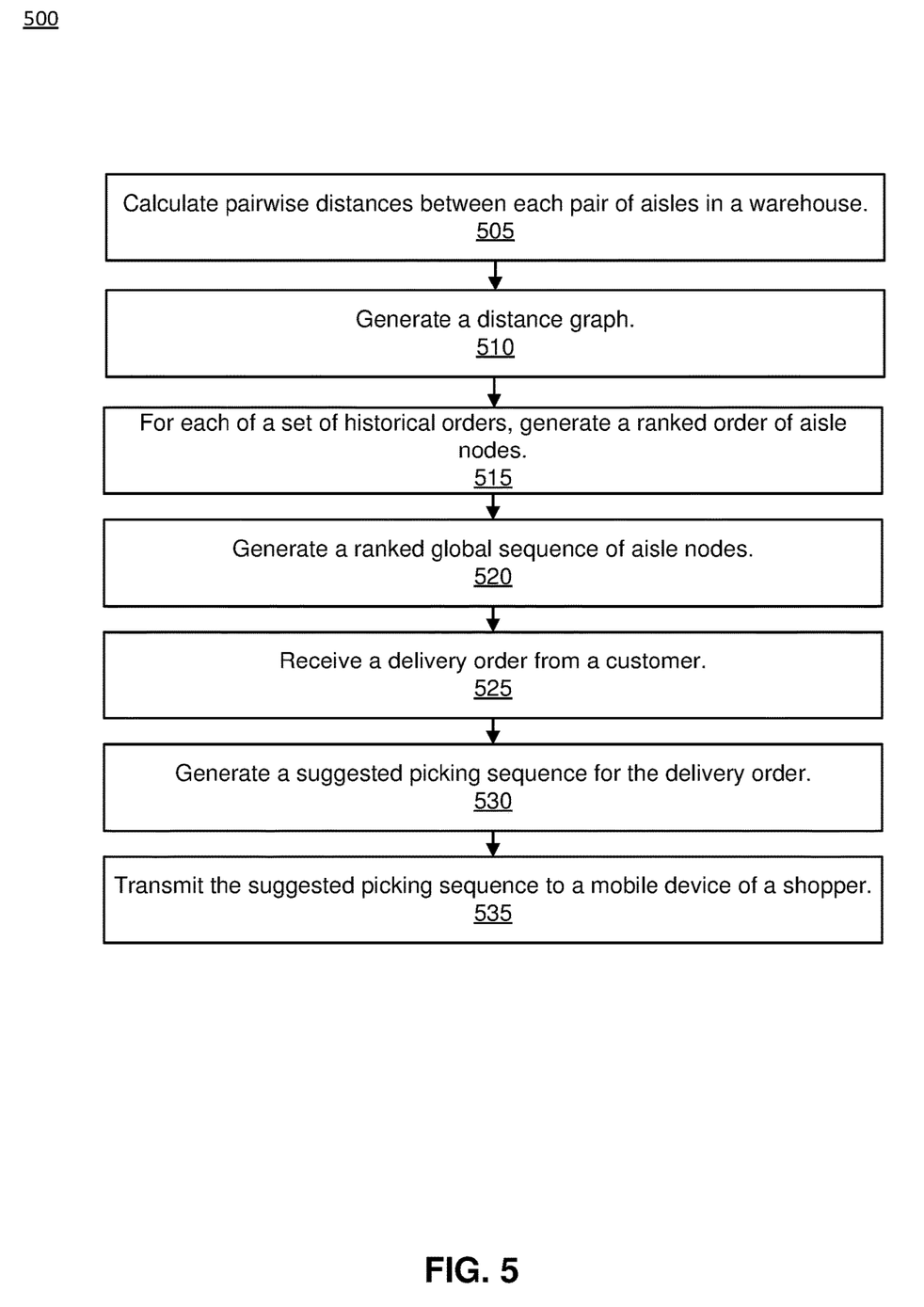
FIG. 5 is a flowchart of a process for generating a suggested picking sequence for items in a delivery order, according to one embodiment.

FIG. 5 is a flowchart 500 of one embodiment of a method for generating a suggested picking sequence for items in a delivery order. In various embodiments, the method includes different or additional steps than those described in conjunction with FIG. 5. Further, in various embodiments, the steps of the method may be performed in different orders than the order described in conjunction with FIG. 5. The method described in conjunction with FIG. 5 may be carried out by the online concierge system 102 in various embodiments.

The online concierge system 102 calculates 505 pairwise distances between each pair of aisles in a warehouse. The online concierge system 102 receives timestamps for items picked in historical shopping orders. The online concierge system 102 calculates the duration between timestamps for sequentially picked items in different aisles. The online concierge system 102 may average the durations for each aisle pair to calculate the pairwise distances, as described in more detail with respect to FIG. 2.

The online concierge system 102 generates 510 a distance graph. The distance graph comprises an aisle node for each aisle in a warehouse. The aisle nodes are connected by edges. Each edge stores the pairwise distance between the connected nodes, as described in more detail with respect to FIG. 2.

For each of a set of historical orders, the online concierge system 102 generates 515 a ranked order of aisle nodes. The online concierge system solves a traveling salesperson problem applied to traversing the aisle nodes. Each item in a historical order corresponds to an aisle node, and the online concierge system 102 solves the TSP for all aisle nodes represented in the historical order. The solution outputs the ranked order of aisle nodes. The solution represents a shortest sequence to pick all items in the historical order.

The online concierge system 102 generates 520 a ranked global sequence of aisle nodes. The online concierge system 102 combines the ranked order of aisle nodes calculated for each historical order to generate the ranked global sequence of aisle nodes. The ranked global sequence may maintain the relative rankings between aisle nodes calculated for the historical orders.

The online concierge system 102 receives 525 a delivery order from a customer. The delivery order identifies a plurality of items. The online concierge system 102 determines a warehouse for the order. The warehouse may be selected by the customer or the online concierge system 102. For each item in the delivery order, the online concierge system 102 identifies an aisle in the warehouse corresponding to that item.

The online concierge system 102 generates 530 a suggested picking sequence for the delivery order. The suggested picking sequence is generated by applying the ranked global sequence to the plurality of items. For example, if the ranked global sequence is A, B, C, D, E, and the deliver order comprises items in aisles A, B, and D, the suggested picking sequence may list the items in aisle A first, followed by the items in aisle B, followed by the items in aisle D.

The online concierge system 102 transmits 535 the suggested picking sequence to a mobile device of a shopper. The suggested picking sequence comprises the list of items for the delivery order in a sequence intended to decrease the amount of time spent by the shopper to pick the items. Each item may be displayed in the SMA with a corresponding aisle for the item. In some embodiments, the items may be displayed one at a time, and in response to the shopper scanning an item, the next suggested item in the sequence may be displayed to the shopper.

Figure 6:
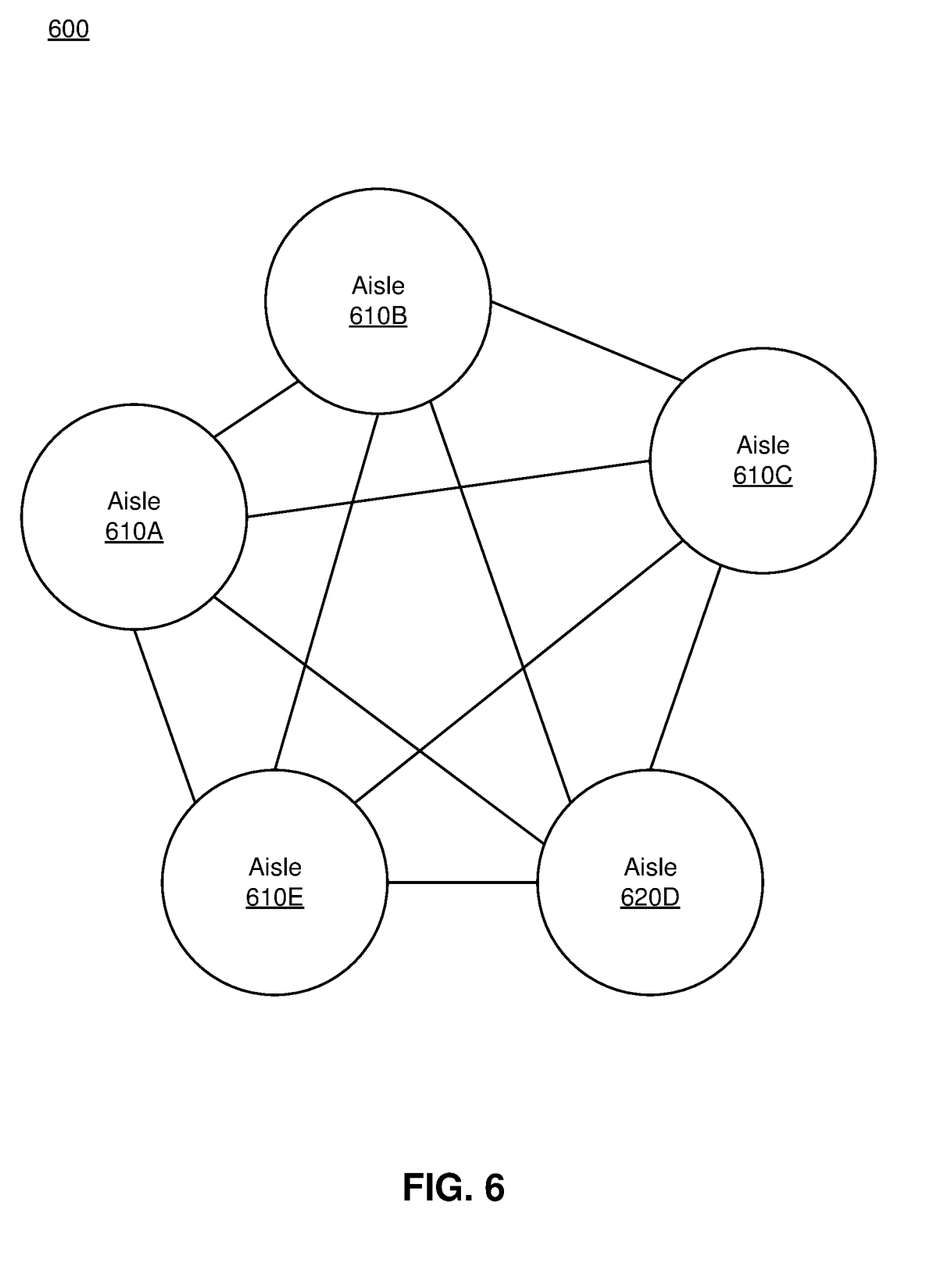
FIG. 6 is an example of a distance graph for a warehouse maintained by an online concierge system, according to one embodiment.

FIG. 6 shows an example distance graph 600 for a warehouse maintained by the online concierge system 102. The distance graph 600 may be an embodiment of the distance graphs described with respect to FIG. 2. As further described above in conjunction with FIG. 2 and FIG. 5, the distance graph 600 includes aisle nodes representing aisles located within a warehouse, along with connections between nodes. In the example of FIG. 6, the aisle graph 600 includes aisle node 610A, aisle node 610B, aisle node 610C, aisle node 610D, and aisle node 610E (also referred to individually and collectively using reference number 610). However, only a subset of an aisle graph is displayed in FIG. 6 for ease of illustration. Each aisle in a warehouse may be represented by an aisle node 610 in the distance graph 600. An edge between aisle nodes 610 represents an average duration between picking a first item in one aisle node 610 and a second item in a different aisle node 610, also referred to herein as the pairwise distance between aisle nodes 610. Each aisle node 610 may be connected to all other aisle nodes 610 in the aisle graph.

Connections between aisle nodes 610 are based on information about sequentially picked items obtained by the online concierge system 102. For example, the online concierge system 102 receives timestamps for two sequentially picked items in a warehouse. Each item may be associated with a different aisle node 610. The online concierge system 102 evaluates the duration between timestamps for each pair of sequentially picked items corresponding to the connected aisle nodes 610. The value of the edge between aisle nodes 610 may be a function of the duration between sequentially picked items, as described in more detail with respect to FIG. 2.

The systems and methods described herein provide practical solutions to more efficiently fulfill online orders. In particular, by utilizing historical picking data to determine relative locations of items within a warehouse, the systems can generate suggested picking sequences which shoppers can use to reduce the amount of time required to fulfill an order.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    calculating, by an online concierge system, a pairwise distance between each pair of aisles in a warehouse;
    generating, by the online concierge system, a distance graph comprising a plurality of aisle nodes;
    for each of a set of historical orders, generating, by the online concierge system, a ranked order of aisle nodes in the plurality of aisle nodes;
    generating, by the online concierge system and based on the ranked orders of aisle nodes for the set of historical orders, a ranked global sequence of the plurality of aisle nodes;
    receiving, by the online concierge system, a delivery order from a device of a customer, the delivery order containing a list of items;
    generating, by the online concierge system, a suggested picking sequence for the delivery order, wherein generating the suggested picking sequence comprises applying a trained item sequence model to the delivery order, and wherein the item sequence model is trained to generate the suggested picking sequence to minimize an amount of time a shopper would spend picking the list of items; and transmitting, by the online concierge system, the suggested picking sequence to a mobile device of the shopper, wherein the transmitting causes the mobile device of the shopper to display the list of items in the suggested picking sequence.

2. The method of claim 1, wherein the plurality of aisle nodes are connected by edges storing the pairwise distance for a respective aisle pair.

3. The method of claim 1, wherein the pairwise distance is calculated by averaging durations between sequentially picked items for an aisle pair in the set of historical orders.

4. The method of claim 3, further comprising eliminating, by the online concierge system and prior to the averaging, a subset of the durations in response to the subset of durations being above or below a threshold.

5. The method of claim 1, wherein each of the ranked orders of aisle nodes is generated by solving a traveling salesperson problem for a respective historical order.

6. The method of claim 1, wherein generating the suggested picking sequence comprises applying the global ranked sequence to a list of items in the delivery order.

7. The method of claim 1, wherein generating the suggested picking sequence comprises determining an aisle in the warehouse corresponding to each item in the delivery order.

8. The method of claim 1, further comprising recalculating, by the online concierge system, the suggested picking sequence based on a location of the mobile device within the warehouse.

9. A computer program product comprising a non-transitory computer readable storage medium having instructions encoded thereon that, when executed by a processor, cause the processor to:
calculate, by the processor, a pairwise distance between each pair of aisles in a warehouse;
generate, by the processor, a distance graph comprising a plurality of aisle nodes;
for each of a set of historical orders, generate, by the processor, a ranked order of aisle nodes in the plurality of aisle nodes;
generate, by the processor and based on the ranked orders of aisle nodes for the set of historical orders, a ranked global sequence of the plurality of aisle nodes;
receive, by the processor, a delivery order from a device of a customer, the delivery order containing a list of items;
generate, by the processor, a suggested picking sequence for the delivery order, wherein generating the suggested picking sequence comprises applying a trained item sequence model to the delivery order, and wherein the item sequence model is trained to generate the suggested picking sequence to minimize an amount of time a shopper would spend picking the list of items; and
transmit, by the processor, the suggested picking sequence to a mobile device of shopper, wherein the transmitting causes the mobile device of the shopper to display the list of items in the suggested picking sequence.

10. The computer program product of claim 9, wherein the plurality of aisle nodes are connected by edges storing the pairwise distance for a respective aisle pair.

11. The computer program product of claim 9, wherein the pairwise distance is calculated by averaging durations between sequentially picked items for an aisle pair in the set of historical orders.

12. The computer program product of claim 11, wherein the instructions further cause the processor to eliminate, prior to the averaging, a subset of the durations in response to the subset of durations being above or below a threshold.

13. The computer program product of claim 9, wherein each of the ranked orders of aisle nodes is generated by solving a traveling salesperson problem for a respective historical order.

14. The computer program product of claim 9, wherein generating the suggested picking sequence comprises applying the global ranked sequence to a list of items in the delivery order.

15. The computer program product of claim 9, wherein generating the suggested picking sequence comprises determining an aisle in the warehouse corresponding to each item in the delivery order.

16. The computer program product of claim 9, wherein the instructions further cause the processor to recalculate the suggested picking sequence based on a location of the mobile device within the warehouse.

17. A computer system comprising:
a processor; and
a non-transitory computer-readable storage medium having instructions encoded thereon that, when executed by the processor, cause the processor to:
calculate, by the processor, a pairwise distance between each pair of aisles in a warehouse;
generate, by the processor, a distance graph comprising a plurality of aisle nodes;
for each of a set of historical orders, generate, by the processor, a ranked order of aisle nodes in the plurality of aisle nodes;
generate, by the processor and based on the ranked orders of aisle nodes for the set of historical orders, a ranked global sequence of the plurality of aisle nodes;
receive, by the processor, a delivery order from a device of a customer, the delivery order identifying a warehouse and a plurality of items;
generate, by the processor, a suggested picking sequence for the delivery order, wherein generating the suggested picking sequence comprises applying a trained item sequence model to the delivery order, and wherein the item sequence model is trained to generate the suggested picking sequence to minimize an amount of time a shopper would spend picking the plurality of items; and
transmit, by the processor, the suggested picking sequence to a mobile device of shopper, wherein the transmitting causes the mobile device of the shopper to display the plurality of items in the suggested picking sequence.

18. The computer system of claim 17, wherein generating the suggested picking sequence comprises determining an aisle in the warehouse corresponding to each of the plurality of items.

19. The computer system of claim 17, further comprising recalculating, by the processor, the suggested picking sequence based on a location of the mobile device within the warehouse.

20. The computer system of claim 17, wherein the plurality of aisle nodes are connected by edges storing the pairwise distance for a respective aisle pair.

* * * * *